(12) United States Patent
Shiohama et al.

(10) Patent No.: US 10,804,521 B2
(45) Date of Patent: Oct. 13, 2020

(54) BATTERY TERMINAL

(71) Applicants: Yazaki Corporation, Tokyo (JP); TOYOTA JIDOSHA KABUSHIKI KAISHA, Toyota-shi, Aichi-ken (JP); AOYAMA SEISAKUSHO CO., LTD., Niwa-gun, Aichi (JP)

(72) Inventors: Takahiro Shiohama, Shizuoka (JP); Yusuke Matsumoto, Shizuoka (JP); Hiroshi Kobayashi, Okazaki (JP); Motoya Hara, Nisshin (JP); Yukio Morozumi, Toyota (JP); Naoki Inaba, Niwa-gun (JP)

(73) Assignees: YAZAKI CORPORATION, Minato-ku, Tokyo (JP); TOYOTA JIDOSHA KABUSHIKI KAISHA, Toyota-shi, Aichi-ken (JP); AOYAMA SEISAKUSHO CO., LTD., Niwa-gun, Aichi (JP)

( * ) Notice: Subject to any disclaimer, the term of this patent is extended or adjusted under 35 U.S.C. 154(b) by 344 days.

(21) Appl. No.: 15/879,636

(22) Filed: Jan. 25, 2018

(65) Prior Publication Data

US 2018/0226627 A1    Aug. 9, 2018

(30) Foreign Application Priority Data

Feb. 3, 2017  (JP) .................................. 2017-018389

(51) Int. Cl.
   *H01M 2/30*   (2006.01)
   *H01R 4/30*   (2006.01)
   (Continued)

(52) U.S. Cl.
   CPC ............ *H01M 2/305* (2013.01); *H01R 4/305* (2013.01); *H01R 11/283* (2013.01);
   (Continued)

(58) Field of Classification Search
   CPC ..................................................... H01M 2/305
   See application file for complete search history.

(56) References Cited

U.S. PATENT DOCUMENTS

2016/0126530 A1   5/2016 Kato et al.
2016/0254518 A1*  9/2016 Kato ..................... H01M 2/307
                                                  429/122

FOREIGN PATENT DOCUMENTS

| JP | 2016-149256 A | 8/2016 | |
| JP | 2018063781 A | 4/2018 | |
| WO | WO-2015087633 A1 * | 6/2015 | ............ H01M 2/307 |

OTHER PUBLICATIONS

Communication dated Apr. 4, 2019 from German Patent Office in counterpart DE Application No. 10 2018 201 465.5.

* cited by examiner

*Primary Examiner* — Brian R Ohara

(74) *Attorney, Agent, or Firm* — Sughrue Mion, PLLC

(57) ABSTRACT

A battery terminal includes: a main body unit; a penetration member that is arranged in a manner extending from an end side of the main body unit to the other end side of the main body unit across slits along a tightening direction Y, includes an abutting portion formed in the end side, and has a threaded hole and a taper forming end portion provided with first tapered surfaces formed in the other end side; a fastening member threadedly engaged with the threaded hole; and a pressing force converting member that converts fastening force in an axial direction X generated between the fastening member and the penetration member with rotation of the fastening member around the axial direction X into pressing force in the tightening direction Y pressing the main body unit between the abutting portion and the pressing force converting member along the tightening direction Y.

17 Claims, 8 Drawing Sheets

(51) Int. Cl.
*H01R 4/38* (2006.01)
*H01R 11/28* (2006.01)
*H01R 13/405* (2006.01)

(52) U.S. Cl.
CPC ........... *H01M 2220/20* (2013.01); *H01R 4/38* (2013.01); *H01R 11/287* (2013.01); *H01R 13/405* (2013.01); *H01R 2201/26* (2013.01)

BATTERY TERMINAL

CROSS-REFERENCE TO RELATED APPLICATION(S)

The present application claims priority to and incorporates by reference the entire contents of Japanese Patent Application No. 2017-018389 filed in Japan on Feb. 3, 2017.

BACKGROUND OF THE INVENTION

1. Field of the Invention

The present invention relates to a battery terminal.

2. Description of the Related Art

Japanese Patent Application Laid-open No. 2016-149256 describes one of conventional battery terminals that includes annular portions, a penetration plate, a slipping-off preventing portion, a fastening member supporting portion, a fastening member, a fastened member, and a pressing force converting member. A post insertion hole having a battery post inserted thereto and a slit are formed on the annular portion. The penetration plate penetrates the annular portion from an end portion to the other end portion across the slit along a width direction. The slipping-off preventing portion is provided to an end portion of the penetration plate and prevents the penetration plate from slipping from the annular portions. The fastening member supporting portion is provided to the other end portion of the penetration plate. The fastening member is rotatably supported by the fastening member supporting portion around an axial direction. The fastened member is threadedly engaged with the fastening member. The pressing force converting member is disposed in a manner abutting on the annular portions from the other end portion side of the penetration plate and converts tightening force in the axial direction generated between the fastening member and the fastened member with rotation of the fastening member around the axial direction into pressing force in the width direction that presses the annular portions in directions for reducing the widths of the slits on the annular portions.

The battery terminal described in Japanese Patent Application Laid-open No. 2016-149256 can be still further improved in the fastening manner to the battery post.

SUMMARY OF THE INVENTION

From the above-described viewpoint, the present invention is made, and aims to provide a battery terminal that is capable of appropriately having itself fastened to the battery post.

In order to achieve the above mentioned object, a battery terminal according to one aspect of the present invention includes a main body unit that is provided with a post insertion hole to which a battery post is inserted and a slit continuous to the post insertion hole; a penetration member that is disposed in a manner extending from a first end side of the main body unit to a second end side of the main body unit across the slit along a tightening direction as a direction intersecting an axial direction of the battery post and crossing the slit, includes an abutting portion abutting on the main body unit formed in the first end side in the tightening direction, and has a threaded hole penetrating in the axial direction and having a groove and a taper forming end portion provided with a first tapered surface formed in the second end side in the tightening direction; a fastening member that is threadedly engaged with the threaded hole and moves along the axial direction with rotation around the axial direction; and a pressing force converting member that is provided in a manner movable along the axial direction with move of the fastening member along the axial direction and relatively movable with respect to the penetration member along the tightening direction in abutment with the first tapered surface, the pressing force converting member abutting on the main body unit in the second end side of the main body unit and converting fastening force in the axial direction generated between the fastening member and the penetration member with rotation of the fastening member around the axial direction into pressing force in the tightening direction that presses the main body unit between the abutting portion and the pressing force converting member along the tightening direction in a direction for reducing a width of the slit of the main body unit, wherein the pressing force converting member includes a first restriction portion that is capable of restricting move to the penetration member side along the axial direction by abutting on the penetration member in a predetermined position in the axial direction.

According to another aspect of the present invention, in the battery terminal, it is possible to configure that the first tapered surface is formed in pairs on respective sides in a facing direction intersecting the axial direction and the tightening direction of the taper forming end portion, the pressing force converting member includes a base portion through which a shank of the fastening member penetrates along the axial direction, and a pair of upstanding portions formed in a manner projecting from the base portion along the axial direction, formed in a manner facing each other along the facing direction, and abuttable on each of the main body unit and the first tapered surface, and the first restriction portion is formed in a manner projecting from the base portion along the axial direction and is positioned between the pair of upstanding portions in the facing direction.

According to still another aspect of the present invention, in the battery terminal, it is possible to configure that the pressing force converting member includes a second restriction portion that is capable of restricting move to the main body unit side along the axial direction by abutting the main body unit, the second restriction portion is positioned in the main body unit side in the tightening direction, and the first restriction portion is positioned opposite to the main body unit side in the tightening direction.

According to still another aspect of the present invention, in the battery terminal, it is possible to configure that the first restriction portion has a kerf formed in an end on a side abutting the penetration member.

According to still another aspect of the present invention, in the battery terminal, it is possible to configure that the first restriction portion abuts on the penetration member in a state where a predetermined torque is applied to the fastening member.

According to still another aspect of the present invention, in the battery terminal, it is possible to configure that the pressing force converting member has a second tapered surface abutting on the first tapered surface and includes a portion with the second tapered surface formed positioned between the main body unit and the taper forming end portion in the tightening direction, and the first tapered surface and the second tapered surface are inclined toward a direction for converting fastening force in the axial direction generated between the fastening member and the penetration member into pressing force in the tightening direction that presses the main body unit between the abutting portion and the pressing force converting member along the tightening direction, when the pressing force converting member together with the fastening member approaches the penetration member side along the axial direction with rotation of the fastening member around the axial direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 1:
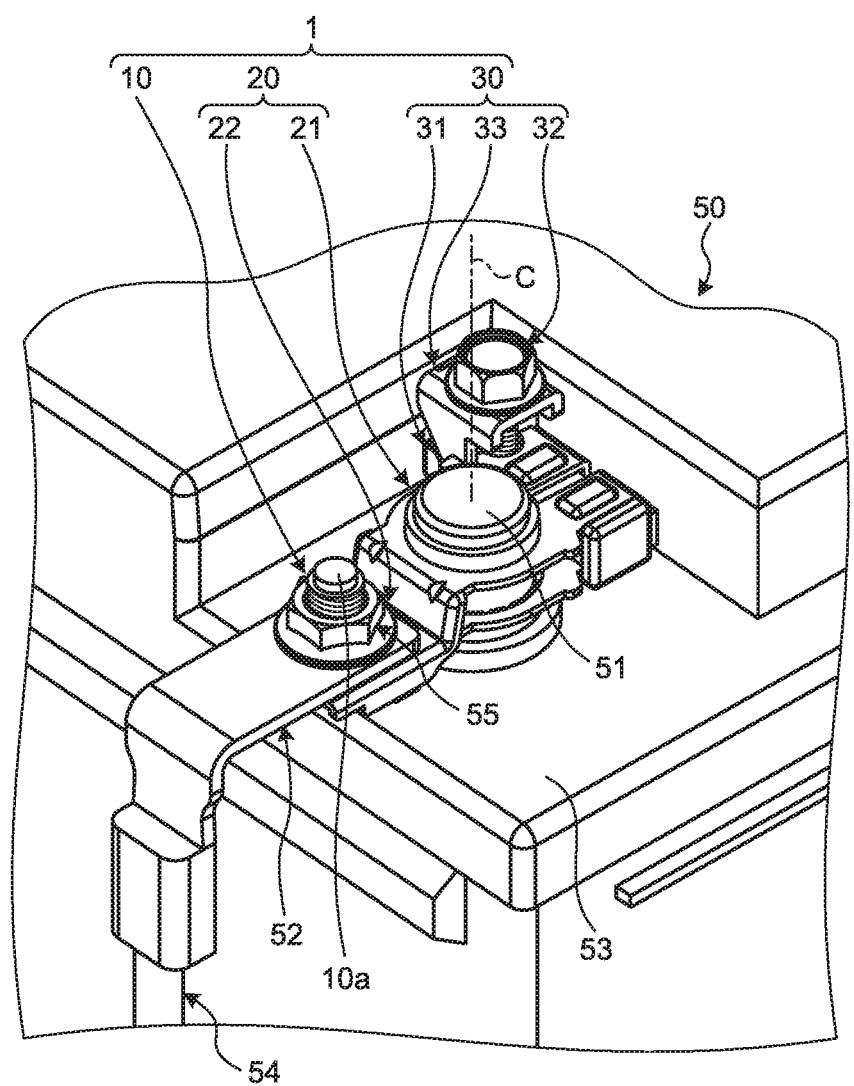
FIG. 1 is a partial perspective view that illustrates schematic configurations of a battery terminal according to an embodiment and a battery.
Figure 1:
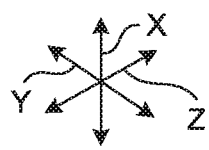
Figure 2:
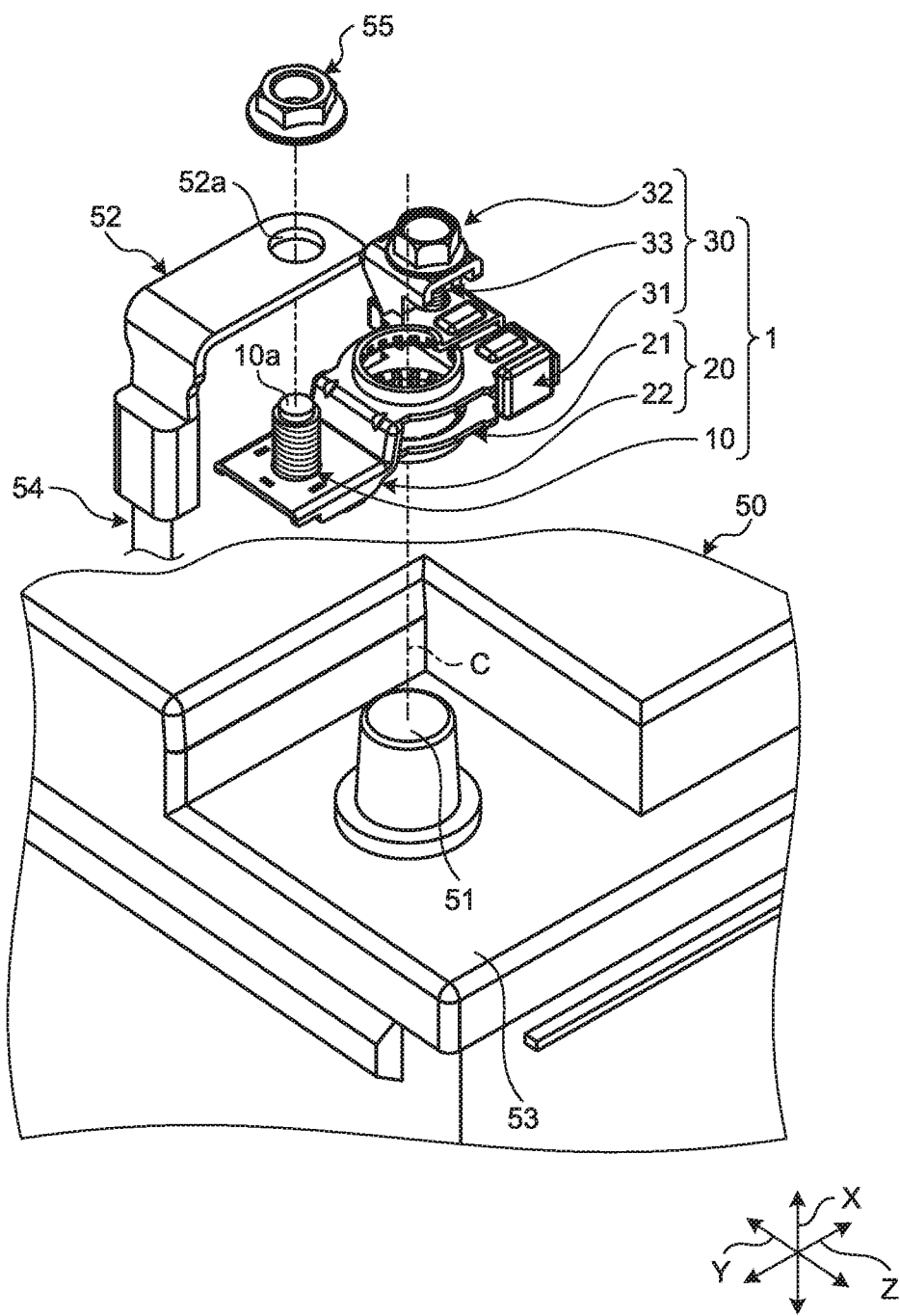
FIG. 2 is a partial exploded perspective view that illustrates schematic configurations of the battery terminal according to the embodiment and the battery.
Figure 3:
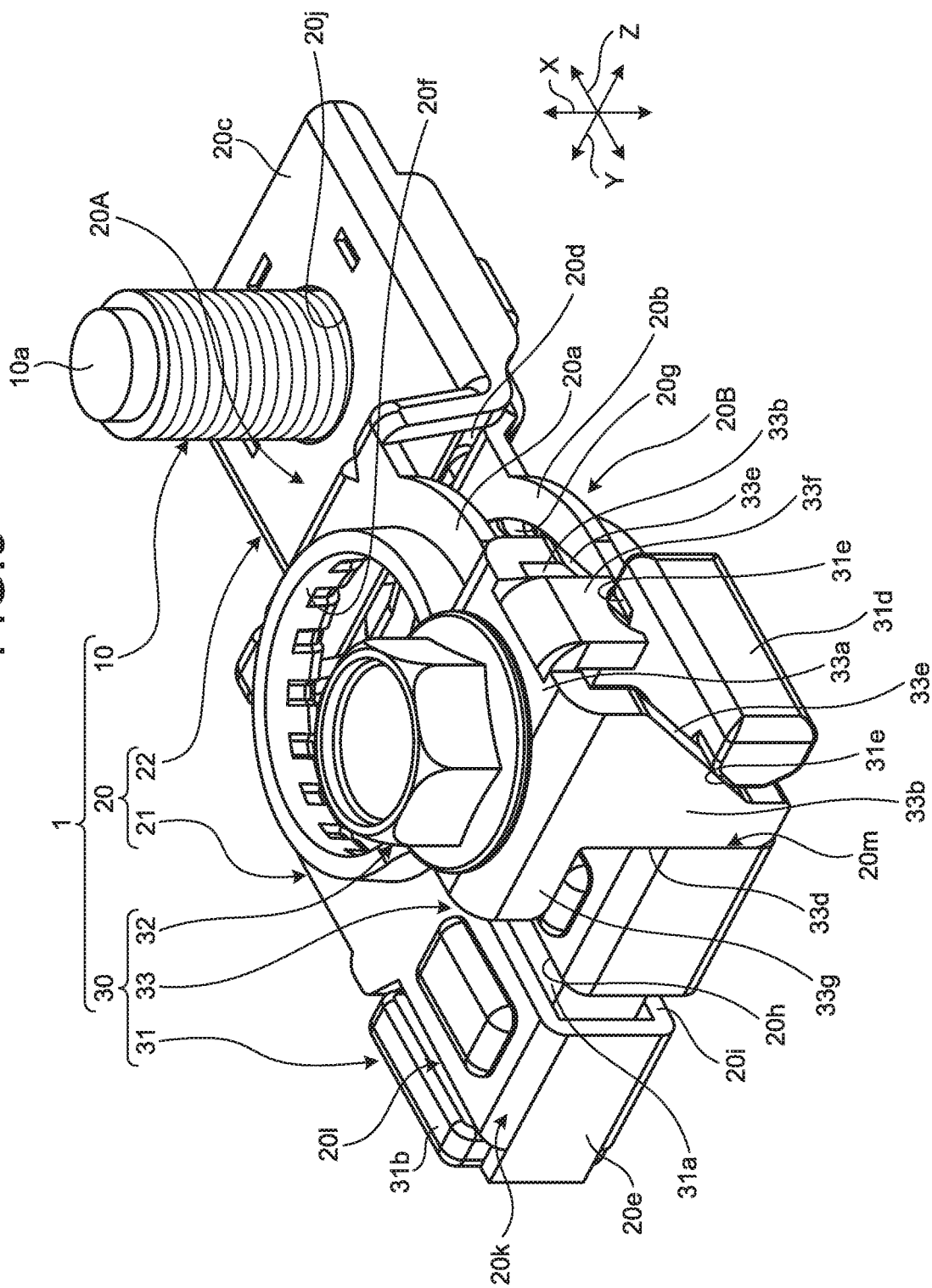
FIG. 3 is a perspective view that illustrates a schematic configuration of the battery terminal according to the embodiment.
Figure 4:
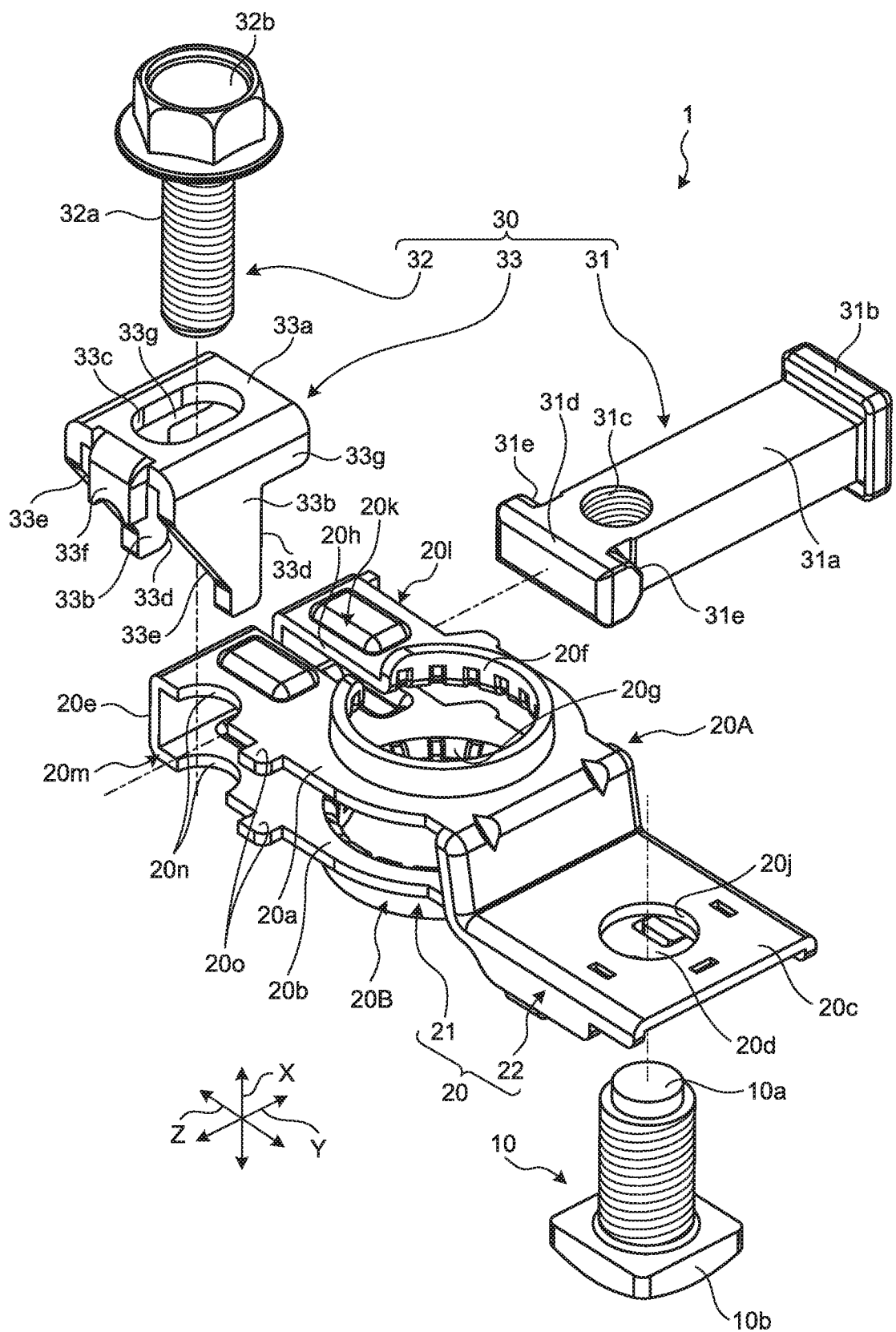
FIG. 4 is an exploded perspective view that illustrates a schematic configuration of the battery terminal according to the embodiment.

An embodiment according to the present invention will now be described in detail with reference to the drawings. It should be noted that the embodiment is not intended to limit the scope of the present invention. The structural components in the following embodiment include what the skilled person could readily replace and what are the substantially the same.

Embodiment

A battery terminal 1 according to an embodiment illustrated in FIGS. 1 to 4 is assembled to a battery post 51 of a battery 50. The battery terminal 1 is a part that electrically connects the battery 50 with a connection terminal 52 and others by being assembled to the battery post 51. The battery 50 is mounted on a vehicle and others as an electrical storage device. The battery 50 has the battery post 51 vertically disposed on one of surfaces of a battery housing 53 accommodating therein battery fluid and various kinds of parts constituting the battery 50, generally, on the top surface in the vertical direction with the battery 50 mounted on the vehicle. The battery post 51 vertically projects upward from the top surface in the vertical direction of the battery housing 53. The battery post 51 is formed in a column (or in a cylindrical) shape, more specifically, in a column shape tapered toward the front end with an increase in the diameter. The battery post 51 is therefore in a tapered shape with the front end having a smaller outer diameter than the outer diameter of the base end. The battery post 51 is disposed with a center axis line C arranged along the vertical direction. The battery terminal 1 is fastened to the battery post 51 configured in this manner. The connection terminal 52 is a counterpart connection member provided to an end of an electric wire 54 in the body side of the vehicle and the like on which the battery 50 is mounted.

A direction along the center axis line C of the battery post 51 will be described as an axial direction X. For convenience of description, one of the two directions orthogonal to the axial direction X will be referred to as a first width direction Y, and the other direction will be referred to as a second width direction Z. The first width direction Y and the second width direction Z are directions intersecting the axial direction X. More specifically, the first width direction Y corresponds to a direction in which a later-described tightening unit 30 tightens a main body unit 20. The second width direction Z corresponds to a direction in which a later-described pair of upstanding portions 33b face each other. The axial direction X, the first width direction Y, and the second width direction Z intersect, specifically, in this case, orthogonally intersect one another. Each direction in the following description will indicate a direction with the parts assembled to one another unless otherwise stated.

Specifically, the battery terminal 1 includes a stud bolt 10, a main body unit 20, and the tightening unit 30.

The stud bolt 10 includes a shank 10a and a bolt head 10b (particularly, see FIG. 4), and these parts are integrally formed from conductive metal or the like. The shank 10a is a portion connected with the connection terminal 52. The shank 10a is formed in a column shape and has grooves on its outer peripheral surface. The bolt head 10b is a base portion disposed in an end of the shank 10a and is a base on which the shank 10a is vertically arranged. The bolt head 10b is formed as a part having a larger diameter than that of the shank 10a. In this case, the bolt head 10b is formed in a substantially rectangular shape.

The main body unit 20 includes a post fastening unit 21 and a bolt retaining unit 22. The post fastening unit 21 is a portion fastened to the battery post 51. The bolt retaining unit 22 is a portion adjacently connected to the post fastening unit 21 in the second width direction Z and retaining the stud bolt 10. The main body unit 20 includes a pair of annular portions 20a and 20b constituting the post fastening unit 21, a pair of retaining plate-shape portions 20c and 20d constituting the bolt retaining unit 22, and a bending connection portion 20e, which are integrally formed by the pressing and bending work on a conductive metal plate.

The pair of annular portions 20a and 20b are formed in substantially rectangular annular shapes and have, respectively, post insertion holes 20f and 20g and slits 20h and 20i. The post insertion holes 20f and 20g are substantially circular holes to which the battery post 51 is inserted. The slits 20h and 20i are gaps continuous to the post insertion holes 20f and 20g, respectively. The post insertion holes 20f and 20g are continuous to the slits 20h and 20i, respectively, along the second width direction Z.

The pair of retaining plate-shape portions 20c and 20d are formed in substantially rectangular shapes, and a bolt insertion hole 20j is formed on the retaining plate-shape portion 20c. The bolt insertion hole 20j is a substantially circular hole to which the shank 10a of the stud bolt 10 is inserted.

The annular portion 20a and the retaining plate-shape portion 20c are integrally formed in a manner continuous to each other and constitute an upper board 20A. Likewise, the annular portion 20b and the retaining plate-shape portion 20d are integrally formed in a manner continuous to each other and constitute a lower board 20B.

The annular portions 20a and 20b are integrally formed such that respective ends opposite to the ends with the retaining plate-shape portions 20c and 20d are continuous to each other through the bending connection portion 20e. The upper board 20A and the lower board 20B are integrally formed in a manner coupled with each other by the bending connection portion 20e and continuous to each other through the bending connection portion 20e. With this configuration, the main body unit 20 is formed in a U-shape folded with the bending connection portion 20e interposed therebetween and is formed with a set of the annular portion 20a and the retaining plate-shape portion 20c and a set of the annular portion 20b and the retaining plate-shape portion 20d facing each other in the axial direction X and vertically stacked on one over the other in plate shapes that are substantially parallel with each other. The main body unit 20 is constituted of the upper board 20A and the lower board 20B vertically stacked on one over the other in a manner facing each other along the axial direction X, and the upper board 20A and the lower board 20B have the above-described post insertion holes 20f and 20g and the slits 20h and 20i, respectively.

The state of being vertically stacked generally corresponds to a state stacked on one over the other along the axial direction X of the battery post 51 with the battery terminal 1 assembled to the battery post 51. The stacking direction is generally a direction along the axial direction X with the battery terminal 1 assembled to the battery post 51. More specifically, in this case, a side with the shank 10a of the stud bolt 10 projecting is defined as a stacking direction upper side, whereas the opposite side is defined as a stacking direction lower side. The stacking direction upper side corresponds to the front end side of the battery post 51, whereas the stacking direction lower side corresponds to the base end side of the battery post 51. With regards to the main body unit 20, the stacking direction upper side is a side with the annular portion 20a and the retaining plate-shape portion 20c, and the stacking direction lower side is a side with the annular portion 20b and the retaining plate-shape portion 20d. In the main body unit 20, the upper board 20A corresponds to the stacking direction upper side, and the lower board 20B corresponds to the stacking direction lower side.

More specifically, the post insertion hole 20f and the post insertion hole 20g are formed on the pair of annular portions 20a and 20b, respectively, in such positional relation that the post insertion hole 20f and the post insertion hole 20g face each other in the stacking direction with the annular portions 20a and 20b vertically stacked on one over the other with the bending connection portion 20e interposed therebetween. An inner peripheral surface of the post insertion hole 20f is formed with the sheet metal folded back to the stacking direction upper side. Likewise, an inner peripheral surface of the post insertion hole 20g is formed with the sheet metal folded back to the stacking direction lower side. The post insertion hole 20f and the post insertion hole 20g have tapered portions corresponding to the tapered portion of the above-described battery post 51 on the respective inner peripheral surfaces. Of the post insertion hole 20f and the post insertion hole 20g, a side with the shank 10a of the stud bolt 10 projecting, which is the post insertion hole 20f side, has the smallest inner diameter, and the opposite side, which is the post insertion hole 20g side, has the largest inner diameter. The post insertion hole 20f and the post insertion hole 20g have respective inner peripheral surfaces contact the battery post 51 with the battery post 51 arranged therein.

The pair of annular portions 20a and 20b have the respective slit 20h and slit 20i in such positional relation that the slit 20h and the slit 20i face each other in the stacking direction with the pair of annular portions 20a and 20b vertically stacked on one over the other with the bending connection portion 20e interposed therebetween. The slits 20h and 20i are continuous to each other at the bending connection portion 20e and, as a whole, on the bending connection portion 20e and the annular portions 20a and 20b, extend from the bending connection portion 20e to the post insertion hole 20f and the post insertion hole 20g. In other words, the slits 20h and 20i extend from the post insertion holes 20f and 20g to the bending connection portion 20e in a manner partly splitting the annular portions 20a and 20b. On the pair of annular portions 20a and 20b, the respective portions from the post insertion holes 20f and 20g to the bending connection portion 20e constitute tightened end portions 20k tightened by the later-described tightening unit 30. The slits 20h and 20i penetrate through the tightened end portions 20k from the respective post insertion holes 20f and 20g to the bending connection portion 20e along the second width direction Z. The tightened end portion 20k has rectangular notch portions 20l and 20m, with each of which a part of the tightening unit 30 mates, formed in respective ends on both sides in the first width direction Y. Each of the notch portions 20l and 20m is formed over the annular portion 20a (the upper board 20A) and the annular portion 20b (the lower board 20B). Furthermore, the tightened end portion 20k has a semicircular guiding concave portion 20n (particularly, see FIG. 4) formed in the notch portion 20m. The guiding concave portion 20n is formed on each of the annular portion 20a (the upper board 20A) and the annular portion 20b (the lower board 20B). The tightened end portion 20k further has a restriction projection portion 20o (particularly, see FIG. 4) formed next to the notch portion 20m. Each restriction projection portion 20o positions a part of the tightening unit 30 in the second width direction Z. The restriction projection portion 20o is formed on each of the annular portion 20a (the upper board 20A) and the annular portion 20b (the lower board 20B). The restriction projection portion 20o is formed next to the notch portion 20m in a side opposite to the bending connection portion 20e side of the notch portion 20m in the second width direction Z. The restriction projection portion 20o is formed in a manner projecting along the first width direction Y. From a different viewpoint, the restriction projection portion 20o projects along the first width direction Y to form the notch portion 20m.

The pair of retaining plate-shape portions 20c and 20d undergo the bending work with the shank 10a of the stud bolt 10 arranged in the bolt insertion hole 20j prior to the bending work, thereby retaining the stud bolt 10 in a manner vertically stacked on one over the other with the bending connection portion 20e interposed therebetween. In this case, as described above, the retaining plate-shape portion 20c constitutes the upper board 20A with the bolt insertion hole 20j formed thereon. The bolt insertion hole 20j is a through hole through which the shank 10a of the stud bolt 10 penetrates. The retaining plate-shape portion 20d constitutes the lower board 20B facing the retaining plate-shape portion 20c constituting the upper board 20A in the stacking direction (the axial direction X) and retaining the bolt head 10b of the stud bolt 10 between the retaining plate-shape portion 20c and the lower board 20B. In other words, the pair of retaining plate-shape portions 20c and 20d are stacked in a manner facing each other and retain the bolt head 10b therebetween. In still other words, the bolt retaining unit 22 has the retaining plate-shape portion 20c and the retaining plate-shape portion 20d facing each other along the axial direction X and retain the bolt head 10b of the stud bolt 10 in a manner sandwiching the bolt head 10b between the retaining plate-shape portion 20c and the retaining plate-shape portion 20d in the axial direction X.

Retained between the retaining plate-shape portion 20c and the retaining plate-shape portion 20d, the stud bolt 10 has the shank 10a exposed in a manner projecting from the bolt insertion hole 20j along the axial direction X. The stud bolt 10 has the shank 10a exposed from the bolt insertion hole 20j and electrically connected with the connection terminal 52. The stud bolt 10 has the shank 10a fastened with the connection terminal 52 with the shank 10a arranged in a fastener hole 52a of the connection terminal 52 and with a nut 55 threadedly mounted on the shank 10a. In the bolt retaining unit 22, the retaining plate-shape portion 20c constituting the upper board 20A is sandwiched between the nut 55 and the bolt head 10b of the stud bolt 10 together with the connection terminal 52 with the nut 55 threadedly mounted on the shank 10a of the stud bolt 10.

The tightening unit 30 fastens the main body unit 20 to the battery post 51 with the battery post 51 inserted in the post insertion holes 20f and 20g. The tightening unit 30 abuts on the pair of annular portions 20a and 20b of the main body unit 20 from both sides in the first width direction (the tightening direction) Y and tightens the tightened end portions 20k of the annular portions 20a and 20b. This configuration allows the tightening unit 30 to fasten the main body unit 20 to the battery post 51. The tightening unit 30 includes a plate nut 31 as a penetration member, a fastening bolt 32 as a fastening member, and a bracket 33 as a pressing force converting member. The tightening unit 30 in this embodiment fastens the battery terminal 1 to the battery post 51 by tightening the fastening bolt 32 along the axial direction X. In this case, the tightening unit 30 converts fastening force F1 (see FIG. 7 in later description) of the fastening bolt 32 generated in a direction along the axial direction X into pressing force F2 (see FIG. 7 in later description) in the first width direction Y. The tightening unit 30 fastens the main body unit 20 to the battery post 51 by pressing a part of the battery terminal 1 having the battery post 51 inserted therein by means of the pressing force F2.

Specifically, the plate nut 31 is a member disposed in a manner extending from ends of the annular portions 20a and 20b of the main body unit 20 to the other ends of the annular portions 20a and 20b of the main body unit 20 across the slits 20h and 20i along the first width direction Y. As described above, the first width direction Y is a direction orthogonal to (intersecting with) the axial direction X that extends along the center axis line C of the battery post 51 and corresponds to a direction crossing the slits 20h and 20i formed on the annular portions 20a and 20b. The first width direction Y generally corresponds to a tightening direction in which the tightening unit 30 tightens the annular portions 20a and 20b in fastening the annular portions 20a and 20b to the battery post 51.

More specifically, the plate nut 31 is constituted of a plate portion 31a, an abutting portion 31b, a threaded hole 31c, a taper forming end portion 31d, and first tapered surfaces 31e, which are integrally formed from conductive metal or the like. The plate portion 31a is a body portion of the plate nut 31 and is formed in a substantially rectangular plate shape. The plate portion 31a is a portion disposed on the annular portions 20a and 20b in a manner extending from ends of the annular portions 20a and 20b to the other ends of the annular portions 20a and 20b across the slits 20h and 20i along the first width direction Y. The abutting portion 31b is a portion formed in an end of the plate portion 31a in the first width direction Y and abutting on the annular portions 20a and 20b of the main body unit 20, in this case, on the tightened end portions 20k. More specifically, the abutting portion 31b is formed in an end of the plate portion 31a positioned in the notch portion 201 side of the main body unit 20 with the plate portion 31a assembled to the main body unit 20 in a manner penetrating from ends to the other ends of the annular portions 20a and 20b along the first width direction Y. The abutting portion 31b is integrally formed with the plate portion 31a. In this case, the abutting portion 31b is formed in a substantially rectangular plate shape. The abutting portion 31b is positioned by mating with the notch portion 201 formed on the tightened end portions 20k and being accommodated in the notch portion 201 with the plate nut 31 assembled to the main body unit 20. Accommodated and positioned in the notch portion 201, the abutting portion 31b abuts on the tightened end portions 20k. The threaded hole 31c is a portion formed in the other end side of the plate portion 31a in the first width direction Y, which is an end opposite to the abutting portion 31b, in a manner penetrating through the plate portion 31a in the axial direction X. The threaded hole 31c has grooves formed on its inner peripheral surface in a manner threadedly engageable with the fastening bolt 32. The taper forming end portion 31d is a portion formed in the other side of the plate portion 31a in the first width direction Y, which is an end with the threaded hole 31c, and having the first tapered surfaces 31e formed thereon. More specifically, the taper forming end portion 31d is formed in an end of the plate portion 31a in the notch portion 20m side of the main body unit 20 with the plate portion 31a assembled to the main body unit 20 in a manner penetrating from ends to the other ends of the annular portions 20a and 20b along the first width direction Y. The taper forming end portion 31d is integrally formed with the plate portion 31a. The first tapered surface 31e is a surface facing and abutting on a second tapered surface 33e formed on the bracket 33. The taper forming end portion 31d is formed in an end of the plate portion 31a in a manner projecting on both sides in the second width direction Z and has the first tapered surfaces 31e formed on the respective projecting portions. In other words, the respective first tapered surfaces 31e are formed on portions projecting on both sides in the second width direction Z of the taper forming end portion 31d and formed in pairs on both sides in the second width direction Z. Each first tapered surface 31e may be formed on a surface of the taper forming end portion 31d in a side (in the stacking direction upper side) in the axial direction X and on another surface of the taper forming end portion 31d in the other side (in the stacking direction lower side) in the axial direction X. The direction of inclination of the first tapered surface 31e will be later described in detail.

The plate nut 31 in the above-described configuration has a side with the taper forming end portion 31d inserted between the pair of annular portions 20a and 20b vertically stacked on one over the other. In this process, the plate nut 31 has the side with the taper forming end portion 31d inserted between the pair of annular portions 20a and 20b from the notch portion 201 side of the tightened end portion 20k. The plate nut 31 is inserted from an end side of the bending connection portion 20e in the first width direction Y, which is, in this case, from the notch portion 201 side, in such positional relation that the plate nut 31 crosses the slits 20h and 20i. The plate nut 31 penetrates the main body unit 20 from ends to the other ends of the annular portions 20a and 20b along the first width direction Y and is assembled to the main body unit 20. In other words, the plate nut 31 is inserted in a space formed between the pair of annular portions 20a and 20b vertically stacked on one over the other with the bending connection portion 20e interposed therebetween in a manner crossing the slits 20h and 20i and is assembled to the main body unit 20. Assembled to the main body unit 20, the plate nut 31 is positioned with the abutting portion 31b mating with the notch portion 20l and accommodated in the notch portion 20l. Assembled to the main body unit 20, the plate nut 31 has the threaded hole 31c and the taper forming end portion 31d positioned in the opposite side to the abutting portion 31b with the tightened end portion 20k interposed therebetween. Assembled to the main body unit 20, the plate nut 31 has the abutting portion 31b and the taper forming end portion 31d facing each other in the first width direction Y. Furthermore, assembled to the main body unit 20, the plate nut 31 has the threaded hole 31c arranged along the axial direction X.

The fastening bolt 32 is a member threadedly engaged with the threaded hole 31c formed on the plate nut 31 and moving along the axial direction X by rotating around the axial direction X. The fastening bolt 32 is constituted of a shank 32a and a bolt head 32b, and these parts are integrally formed from conductive metal or the like. The shank 32a is a penetrating portion threadedly engaged with the threaded hole 31c of the plate nut 31. The shank 32a is formed in a column shape. The outer peripheral surface of the shank 32a has grooves threadedly engaged with the grooves of the threaded hole 31c. The bolt head 32b is a base on which the shank 32a is vertically arranged. The bolt head 32b is integrally formed with the shank 32a in an end of the shank 32a. The bolt head 32b is formed as a part having a larger diameter than that of the shank 32a and is, in this case, formed in a substantially hexagonal shape. The bolt head 32b constitutes a portion to which fastening torque is applied by a tool and the like so as to rotate the fastening bolt 32 around the shank 32a. Threadedly engaged with the threaded hole 31c, the fastening bolt 32 relatively moves along the axial direction X with respect to the plate nut 31 with rotation around the axial direction X by the action of the threadedly engaged grooves.

The bracket 33 is a member movable along the axial direction X with move of the fastening bolt 32 along the axial direction X and relatively movable with respect to the plate nut 31 along the first width direction Y in abutment with the first tapered surfaces 31e of the plate nut 31. The bracket 33 is a member that converts the fastening force F1 along the axial direction X into the pressing force F2 along the first width direction Y. Assembled to the shank 32a of the fastening bolt 32, the bracket 33 moves along the axial direction X with move of the fastening bolt 32 along the axial direction X. The bracket 33 abuts on the tightened end portions 20k of the annular portions 20a and 20b of the main body unit 20 in the side with other ends of the annular portions 20a and 20b, which is the side with the taper forming end portion 31d of the plate nut 31, and generates the pressing force F2 in the first width direction Y. The bracket 33 further abuts on the annular portions 20a and 20b of the main body unit 20 in the side with other ends of the annular portions 20a and 20b of the main body unit 20, which is the notch portion 20m side. The bracket 33 converts the fastening force F1 in the axial direction X generated between the fastening bolt 32 and the plate nut 31 with rotation of the fastening bolt 32 around the axial direction X into the pressing force F2 in the first width direction Y.

More specifically, the bracket 33 is constituted of a base portion 33a, the pair of upstanding portions 33b, a penetration portion 33c, abutting surfaces 33d, the second tapered surfaces 33e, first restriction portion 33f, and second restriction portions 33g, and these components are integrally formed from conductive metal and the like.

The base portion 33a is a portion with the shank 32a of the fastening bolt 32 inserted therein along the axial direction X. The base portion 33a is formed in a substantially rectangular plate shape and has the later-described penetration portion 33c formed thereon.

The pair of upstanding portions 33b are portions integrally formed with the base portion 33a and extending from respective two sides facing each other of four sides of the base portion 33a to a side in the axial direction X. The upstanding portions 33b are formed in pairs in a manner facing each other along the second width direction Z. The pair of upstanding portions 33b are formed on respective two sides of the base portion 33a along the first width direction Y. The pair of upstanding portions 33b are formed in a manner projecting from the base portion 33a along the axial direction X. The bracket 33 including the base portion 33a and the upstanding portions 33b is formed, as a whole, in a substantial U-shape. Each of the pair of upstanding portions 33b is abuttable on the main body unit 20 and on the corresponding first tapered surface 31e of the plate nut 31. Each of the pair of upstanding portions 33b further has the abutting surface 33d abuttable on the main body unit 20 and the second tapered surface 33e abuttable on the first tapered surface 31e.

The penetration portion 33c is a through hole through which the shank 32a of the fastening bolt 32 penetrates and is formed on the base portion 33a in a manner penetrating through the base portion 33a in the axial direction X. The penetration portion 33c is formed in a substantially elongated circle shape extending along the first width direction Y. The bracket 33 has the shank 32a of the fastening bolt 32 inserted in the penetration portion 33c along the axial direction X. This process allows the bracket 33 to be assembled to the fastening bolt 32 in a manner movable along the axial direction X. With the penetration portion 33c formed in a substantially elongated circle shape along the first width direction Y, the bracket 33 is configured in a manner relatively movable with respect to the fastening bolt 32 along the first width direction Y with the shank 32a of the fastening bolt 32 inserted in the penetration portion 33c. With this configuration, assembled to the fastening bolt 32 with the shank 32a of the fastening bolt 32 threadedly engaged with the threaded hole 31c of the plate nut 31, the bracket 33 is relatively movably supported along the axial direction X and the first width direction Y with respect to the plate nut 31 through the fastening bolt 32. With the bracket 33 supported in such positional relation that the shank 32a of the fastening bolt 32 is inserted in the penetration portion 33c and is further threadedly engaged with the threaded hole 31c of the plate nut 31, each upstanding portion 33b is positioned closer to the plate portion 31a with respect to the base portion 33a. Assembled to the plate nut 31 through the fastening bolt 32, the bracket 33 generally has the base portion 33a positioned in the stacking direction (the vertical direction) upper side and has each upstanding portion 33b positioned in the stacking direction (the vertical direction) lower side.

On the bracket 33, the abutting surfaces 33d are portions abutting on the main body unit 20. Each abutting surface 33d is formed on an end surface of the upstanding portion 33b in a side in the first width direction Y. On the upstanding portion 33b, each abutting surface 33d is formed on a surface facing the tightened end portions 20k in the first width direction Y in the side with other ends of the annular portions 20a and 20b of the main body unit 20, which is in the notch portion 20m side, and constitutes a surface abutting on the tightened end portions 20k. In other words, with the bracket 33 assembled to the plate nut 31 through the fastening bolt 32, each abutting surface 33d is formed on a surface of the upstanding portion 33b in the tightened end portion 20k side in the first width direction Y. The abutting surface 33d is formed as a surface along the axial direction X on an end surface of the upstanding portion 33b. Assembled to the plate nut 31 through the fastening bolt 32, the bracket 33 is positioned with each abutting surface 33d side mating with the notch portion 20m formed on the above-described tightened end portions 20k and accommodated in the notch portion 20m. In this state, the bracket 33 has each abutting surface 33d side abutting on the tightened end portions 20k of the annular portions 20a and 20b. In this case, each abutting surface 33d abuts on the upper board 20A and the lower board 20B. With the bracket 33 assembled to the fastening bolt 32 and the shank 32a threadedly engaged with the threaded hole 31c of the plate nut 31, the fastening bolt 32 is positioned with the shank 32a mating with the guiding concave portions 20n formed in the notch portion 20m and accommodated in the guiding concave portions 20n.

The second tapered surface 33e is a surface facing and abutting on the first tapered surface 31e formed on the taper forming end portion 31d of the plate nut 31 with the bracket 33 assembled to the plate nut 31 through the fastening bolt 32. The second tapered surface 33e in this embodiment faces and abuts on the first tapered surface 31e. Each second tapered surface 33e is formed on an end surface of the upstanding portion 33b in the other side in the first width direction Y. On the upstanding portion 33b, each second tapered surface 33e is formed on a surface opposite to the surface in the tightened end portion 20k side facing the tightened end portion 20k of the main body unit 20 in the first width direction Y. In other words, the second tapered surface 33e is formed on a surface opposite to the abutting surface 33d abutting on the main body unit 20 in the first width direction Y. Assembled to the plate nut 31 through the fastening bolt 32, the bracket 33 has the portions with the second tapered surfaces 33e formed on the upstanding portions 33b positioned between the tightened end portions 20k and the taper forming end portion 31d in the first width direction Y. The bracket 33 has each second tapered surface 33e facing and abutting on the corresponding first tapered surface 31e in the taper forming end portion 31d side.

The first tapered surface 31e and the second tapered surface 33e are formed as surfaces facing and abutting on each other and inclined in the axial direction X. More specifically, the first tapered surface 31e and the second tapered surface 33e are inclined in a direction in which the fastening force F1 is converted into the pressing force F2 when the bracket 33 approaches the plate nut 31 side along the axial direction X together with the fastening bolt 32 with the fastening bolt 32 rotating around the axial direction X. The fastening force F1 is force generated between the fastening bolt 32 and the plate nut 31 along the axial direction X. Meanwhile, the pressing force F2 is force pressing the tightened end portions 20k on the annular portions 20a and 20b of the main body unit 20 between the abutting portion 31b and the bracket 33 along the first width direction Y. Each second tapered surface 33e is an inclined surface formed in such a manner that gradually comes closer to the tightened end portion 20k side with an increase in the distance from the base portion 33a along the axial direction X, with the bracket 33 assembled to the plate nut 31 through the fastening bolt 32. In other words, the second tapered surface 33e is an inclined surface formed such that the width of the upstanding portion 33b, which has the abutting surface 33d formed parallel to the axial direction X, along the first width direction Y is gradually decreased from the base end side (the base portion 33a side) toward the front end side in the axial direction X. Each first tapered surface 31e is formed as an inclined surface facing the corresponding second tapered surface 33e and fitting to the second tapered surface 33e with the bracket 33 assembled to the plate nut 31 through the fastening bolt 32. Abutting on the corresponding second tapered surface 33e, the first tapered surface 31e is formed as an inclined surface substantially parallel with the second tapered surface 33e. With this configuration, an appropriate contact state is maintained between each first tapered surface 31e and the corresponding second tapered surface 33e. In other words, with the plate nut 31 assembled to the main body unit 20, the first tapered surface 31e is formed as an inclined surface that gradually comes closer to the tightened end portion 20k side with an increase in the distance from a side (the stacking direction upper side) with the fastening bolt 32 and the bracket 33 toward the other side (the stacking direction lower side) opposite to the fastening bolt 32 and the bracket 33 along the axial direction X. In other words, the first tapered surface 31e is an inclined surface formed such that the taper forming end portion 31d has its width along the first width direction Y gradually increased with an increase in the distance from a side with the fastening bolt 32 and the bracket 33 toward the other side opposite to the fastening bolt 32 and the bracket 33 along the axial direction X.

The first restriction portion 33f is a portion capable of restricting move of the bracket 33 to the plate nut 31 side along the axial direction X by abutting on the plate nut 31 in a predetermined position in the axial direction X. The first restriction portion 33f in this embodiment is a portion integrally formed with the base portion 33a and extending from a side positioned in the second tapered surface 33e side of two sides along the second width direction Z of the base portion 33a to a side in the axial direction X. The first restriction portion 33f is formed in a manner projecting from the base portion 33a along the axial direction X. The first restriction portion 33f is positioned between the pair of upstanding portions 33b in the second width direction Z and is formed in a manner projecting to the same side as the side in which the upstanding portions 33b project in the axial direction X. The first restriction portion 33f is formed in a manner projecting to the plate portion 31a side of the plate nut 31 with the bracket 33 assembled to the plate nut 31 through the fastening bolt 32. The first restriction portion 33f restricts move of the bracket 33 along the axial direction X with rotation of the fastening bolt 32 around the axial direction X in a predetermined position by abutting on the plate nut 31 with predetermined fastening torque applied to the fastening bolt 32. The predetermined position where the first restriction portion 33f and the plate nut 31 abut on each other is a position rendering the magnitude of the fastening force F1 in the axial direction X and the resulting pressing force F2 in the first width direction Y not excessively large but in an appropriate range. In other words, the predetermined torque is generally torque rendering the magnitude of the fastening force F1 in the axial direction X and the resulting pressing force F2 in the first width direction Y not excessively large but in an appropriate range. For example, the first restriction portion 33f may be formed so as not to abut on the plate nut 31 with the fastening force F1 and the pressing force F2 in the lower limit of the appropriate range and so as to abut on the plate nut 31 with the fastening force F1 and the pressing force F2 in the upper limit of the appropriate range.

The second restriction portions 33g are portions capable of restricting move of the bracket 33 to the main body unit 20 side along the axial direction X by abutting on the main body unit 20. The respective second restriction portions 33g are provided on the sides with the pair of upstanding portions 33b on the base portion 33a. The respective second restriction portions 33g are provided on two sides along the first width direction Y of the base portion 33a. The second restriction portions 33g are portions extending from the two sides of the base portion 33a to a side in the axial direction X. The second restriction portion 33g is formed in a manner projecting from the base portion 33a along the axial direction X and is particularly formed in a manner projecting to the same side as the side in which the upstanding portions 33b and the first restriction portion 33f project in the axial direction X. In other words, the second restriction portions 33g are formed in a manner projecting to the main body unit 20 side with the bracket 33 assembled to the plate nut 31 through the fastening bolt 32. Assembled to the plate nut 31 through the fastening bolt 32, the bracket 33 generally has the base portion 33a positioned in the stacking direction (the vertical direction) upper side and each upstanding portion 33b, the first restriction portion 33f, and each second restriction portion 33g positioned in the stacking direction (the vertical direction) lower side. Each second restriction portion 33g is positioned in the main body unit 20 side of the corresponding upstanding portion 33b in the first width direction Y. Each second restriction portion 33g is formed in a manner continuous to the corresponding upstanding portion 33b along the first width direction Y. In this case, the bracket 33 has the second restriction portion 33g positioned in the main body unit 20 side in the first width direction Y and has the first restriction portion 33f positioned opposite to the main body unit 20 side in the first width direction Y. As is the case of the first restriction portion 33f, the second restriction portion 33g restricts move of the bracket 33 to the main body unit 20 side along the axial direction X by abutting on the main body unit 20 in a predetermined position in the axial direction X. In other words, the second restriction portion 33g restricts move of the bracket 33 along the axial direction X with rotation of the fastening bolt 32 around the axial direction X in a predetermined position by abutting on the plate nut 31 with predetermined fastening torque applied to the fastening bolt 32. The second restriction portion 33g in this embodiment abuts on the tightened end portion 20k of the main body unit 20, in this case, on the annular portion 20a constituting the upper board 20A. The bracket 33 in this embodiment has each component formed such that the position in the axial direction where the first restriction portion 33f abuts on the plate nut 31 and the position in the axial direction X where the second restriction portion 33g abuts on the main body unit 20 are substantially in the same level. In other words, the bracket 33 has each component formed such that, when the bracket 33 moves along the axial direction X with the fastening bolt 32 rotating around the axial direction X, the first restriction portion 33f and the second restriction portion 33g abut on the plate nut 31 and the main body unit 20, respectively, at substantially the same time.

Figure 5:
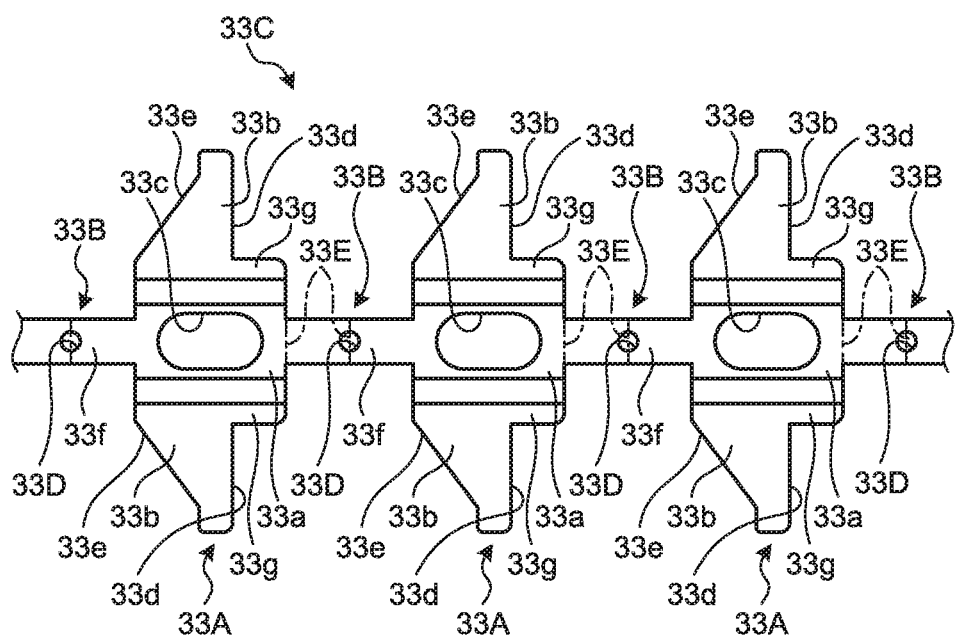
FIG. 5 is a partial plan view of an assembly of to-be-formed brackets according to the embodiment.
Figure 6:
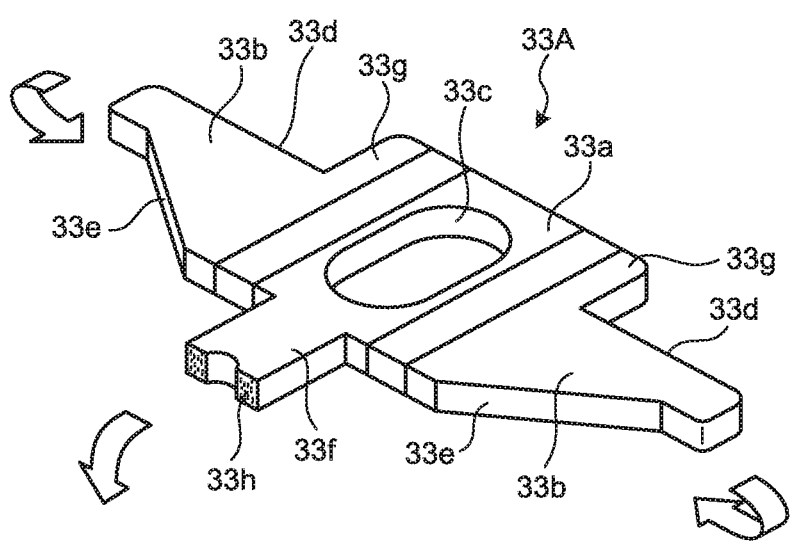
FIG. 6 is a perspective view that illustrates a schematic configuration of the to-be-formed bracket according to the embodiment.

The bracket 33 in the above-described configuration has each component three-dimensionally integrally formed with each other by bending a to-be-formed bracket 33A as illustrated in FIGS. 5 and 6. A plurality of to-be-formed brackets 33A constitute an assembly 33C, for example, in a manner coupled together by carriers 33B serving as coupling portions. The bracket 33 is formed with the carriers 33B partly cut off from the assembly 33C as appropriate, with the to-be-formed brackets 33A accordingly separated from one another, and with each of the separated to-be-formed brackets 33A bent. More specifically, a plurality of to-be-formed brackets 33A and a plurality of carriers 33B in the assembly 33C are integrally formed by pressing a sheet of metal into a shape corresponding to the portions of the to-be-formed brackets 33A and the carriers 33B. In this process, each to-be-formed bracket 33A in the assembly 33C is formed into a plate shape that corresponds to the shapes of the base portion 33a, the pair of upstanding portions 33b, the penetration portion 33c, the abutting surfaces 33d, the second tapered surfaces 33e, the first restriction portion 33f, the pair of second restriction portions 33g, and others. Each carrier 33B in the assembly 33C is formed into a strip shape that couples adjacently arranged base portions 33a of the to-be-formed brackets 33A with each other. The carrier 33B couples a side (a side in the first restriction portion 33f side) extending along the second width direction Z of a base portion 33a with the other side (a side opposite to the first restriction portion 33f side) extending along the second width direction Z of the adjacent base portion 33a with each other. Each carrier 33B has a pilot hole 33D and others formed in substantially the center position in the direction (a direction in which the to-be-formed brackets 33A are aligned) in which the base portions 33a are coupled. For example, in manufacturing the bracket 33 using a manufacturing machine, the pilot hole 33D is used for adjustment of pitch in feeding the assembly 33C of the to-be-formed brackets 33A in a certain direction with the manufacturing machine. Each pilot hole 33D is formed in a manner penetrating through the corresponding carrier 33B. After separation of the to-be-formed brackets 33A, a part of the carrier 33B constitutes the first restriction portion 33f. In other words, the first restriction portion 33f in this embodiment is formed utilizing a part of the carrier 33B. In the assembly 33C, the to-be-formed brackets 33A are separated from one another and cut out with the carriers 33B cut off at certain cutting positions 33E. The cutting positions 33E correspond to a position where an end opposite to another end with the first restriction portion 33f in the first width direction Y of the base portion 33a is coupled with the carrier 33B and a front end position of the first restriction portion 33f. As described above, the first restriction portion 33f abuts on the plate nut 31 in a predetermined position with move of the bracket 33 along the axial direction X. With this configuration, the carrier 33B is cut at the above-described cutting positions 33E such that a certain length of the carrier 33B based on the predetermined position remains in a manner coupled with the base portion 33a. With this process, the remaining portion of the carrier 33B coupled with the base portion 33a constitutes the first restriction portion 33f. The first restriction portion 33f formed in this manner abuts on the plate nut 31 in a predetermined position with move of the bracket 33 along the axial direction X as described above. Moreover, the first restriction portion 33f formed in this manner has a kerf 33h on an end in a side abutting on the plate nut 31, which is a front end portion corresponding to the cutting position 33E. The kerf 33h is a machining kerf left in the process of cutting off the carrier 33B and separating and cutting out the to-be-formed bracket 33A. The to-be-formed bracket 33A cut out from the assembly 33C as described above is bent at portions corresponding to the base portion 33a, the pair of upstanding portions 33b, the first restriction portion 33f, the pair of second restriction portions 33g, and others, whereby the bracket 33 having three-dimensionally integrally formed portions is formed.

Components of the battery terminal 1 in the above-described configuration are assembled to one another with the plate nut 31 assembled to the main body unit 20, the bracket 33 fit to the shank 32a of the fastening bolt 32, and the shank 32a threadedly engaged with the threaded hole 31c of the plate nut 31. In this case, the battery terminal 1 has the plate nut 31 assembled to the main body unit 20 such that the first tapered surfaces 31e of the taper forming end portion 31d face in the stacking direction upper side. The battery terminal 1 further has the bracket 33 and the fastening bolt 32 assembled to the plate nut 31 with the bracket 33 interposed between the bolt head 32b of the fastening bolt 32 and the plate nut 31 in the axial direction X. In the battery terminal 1, with the plate nut 31 assembled to the main body unit 20 and the bracket 33 assembled to the plate nut 31 through the fastening bolt 32, the abutting portion 31b of the plate nut 31 is positioned by mating with the notch portion 20l and being accommodated in the notch portion 20l. In the battery terminal 1 in this state, each abutting surface 33d side of the bracket 33 is positioned by mating with the notch portion 20m and being accommodated in the notch portion 20m, and the shank 32a of the fastening bolt 32 is positioned by mating with the guiding concave portions 20n and being accommodated in the guiding concave portions 20n. In the battery terminal 1 in this state, furthermore, each restriction projection portion 20o abuts on the bracket 33 in a side opposite to the bending connection portion 20e and restricts move of the bracket 33 to the side opposite to the bending connection portion 20e. The battery terminal 1 is assembled to the battery post 51 with the battery post 51 inserted in the post insertion holes 20f and 20g in such positional relation that the shank 10a of the stud bolt 10 is exposed in the stacking direction upper side. In the battery terminal 1, with the inner peripheral surfaces of the post insertion holes 20f and 20g contacting the outer peripheral surface of the battery post 51, the fastening bolt 32 is tightened from a side in the axial direction X, in this case, from the stacking direction (the vertical direction) upper side. In this manner, the battery terminal 1 is fastened to the battery post 51 with both sides of the tightened end portions 20k on the annular portions 20a and 20b tightened in the first width direction Y with the slits 20h and 20i interposed therebetween.

Figure 7:
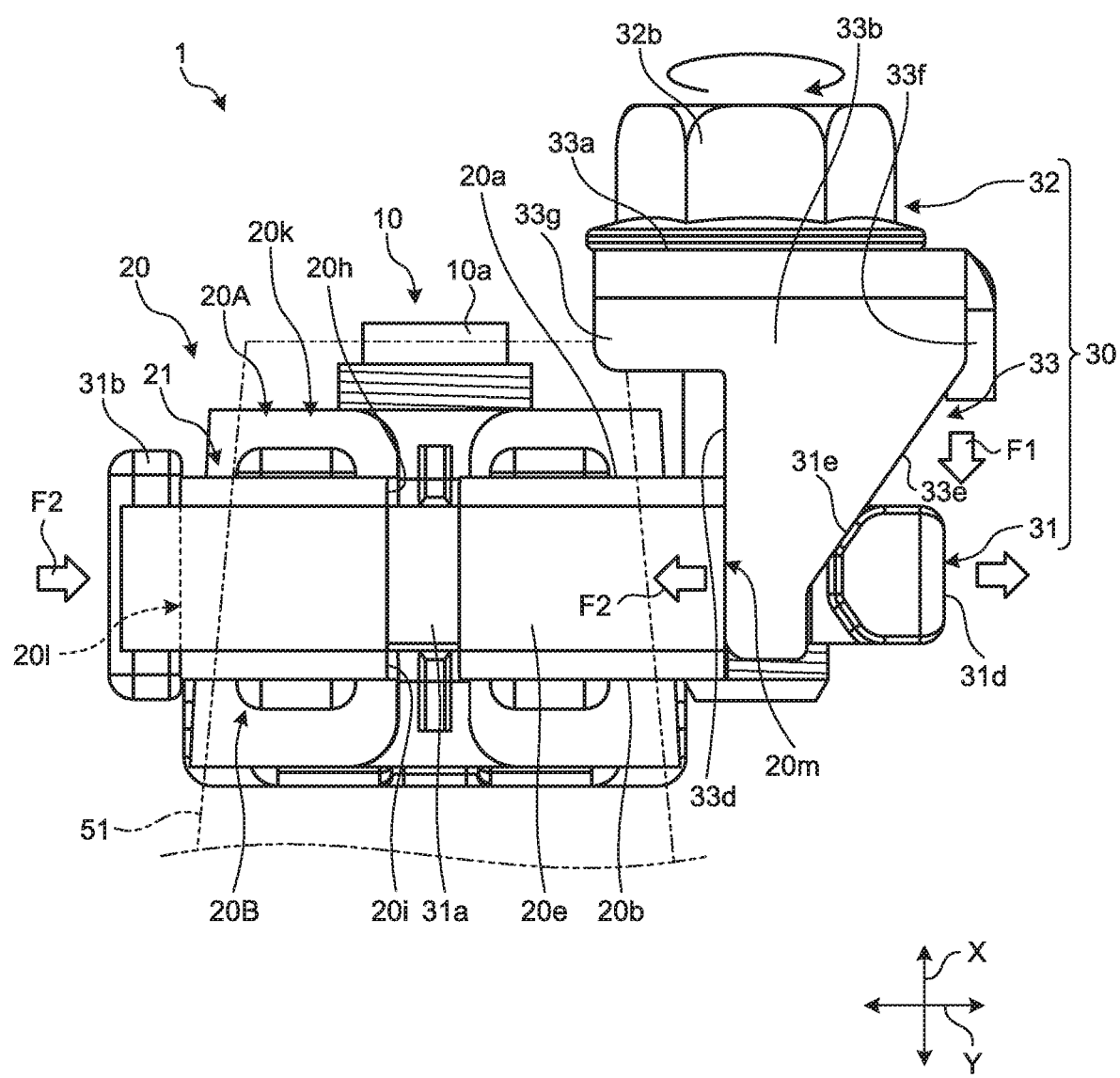
FIG. 7 is a front view of the battery terminal according to the embodiment when viewed from a side in a second width direction.

More specifically, the battery terminal 1 has the fastening bolt 32 rotated around the axial direction X (the shank 32a) by a tool or the like to move to the other side in the axial direction X, in this case, to the stacking direction (the vertical direction) lower side by the action of threading. In the battery terminal 1, with move of the fastening bolt 32 to the other side (the stacking direction lower side) in the axial direction X, the bracket 33 moves to the other side in the axial direction X and approaches the taper forming end portion 31d side of the plate nut 31. In this process, with each abutting surface 33d contacting the tightened end portions 20k of the annular portions 20a and 20b and with the notch portion 20m and the restriction projection portions 20o formed on the tightened end portions 20k restricting rotation around the axial direction X, the bracket 33 is guided to move along the axial direction X. In the battery terminal 1, with move of the bracket 33 in the axial direction X, each second tapered surface 33e formed on the bracket 33 abuts on the corresponding first tapered surface 31e formed on the taper forming end portion 31d of the plate nut 31. In the battery terminal 1, with further move of the fastening bolt 32 along the axial direction X, the bracket 33 accordingly moves along the axial direction X with each second tapered surface 33e abutting on the corresponding first tapered surface 31e. The battery terminal 1 has the plate nut 31 pulled toward the taper forming end portion 31d side along the first width direction Y with each second tapered surface 33e of the bracket 33 relatively moving with respect to the plate nut 31 along the first width direction Y in abutment with the corresponding first tapered surface 31e. As illustrated in FIG. 7, this configuration allows the battery terminal 1 to convert the fastening force F1 in the axial direction X generated between the fastening bolt 32 and the plate nut 31 with rotation of the fastening bolt 32 around the axial direction X into the pressing force F2 in the first width direction Y. The pressing force F2 in the first width direction Y is force that presses the tightened end portions 20k on the annular portions 20a and 20b of the main body unit 20 between the abutting portion 31b of the plate nut 31 and each abutting surface 33d of the bracket 33 along the first width direction Y in directions for reducing the widths of the slits 20h and 20i of the main body unit 20. In the battery terminal 1, when the bracket 33 approaches the plate nut 31 side together with the fastening bolt 32 along the axial direction X with rotation of the fastening bolt 32, each first tapered surface 31e and the corresponding second tapered surface 33e facing and abutting on each other act to convert the fastening force F1 in the axial direction X generated between the fastening bolt 32 and the plate nut 31 into the pressing force F2 along the first width direction Y. Consequently, in the battery terminal 1, the tightened end portions 20k of the annular portions 20a and 20b are pressed in directions for reducing the widths of the slits 20h and 20i, whereby the slits 20h and 20i come to have smaller widths.

In the battery terminal 1, the pressing force F2 converted and generated by each first tapered surface 31e and the corresponding second tapered surface 33e with rotation of the fastening bolt 32 presses the main body unit 20 in a manner reducing the widths of the slits 20h and 20i. This process reduces the diameters of the post insertion holes 20f and 20g with the inner peripheral surfaces of the post insertion holes 20f and 20g contacting the outer peripheral surface of the battery post 51, which allows the battery terminal 1 to be fastened to the battery post 51.

Figure 8:
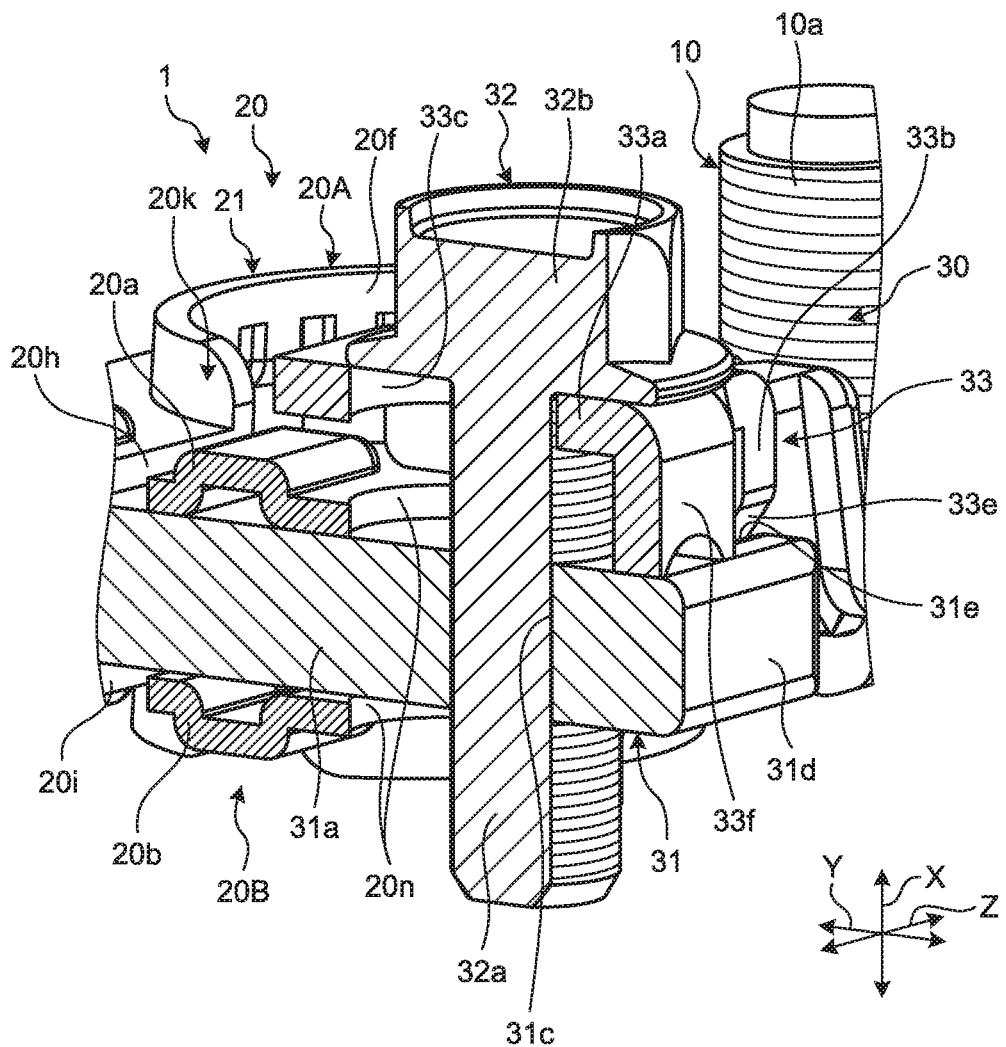
FIG. 8 is a partial sectional perspective view of the battery terminal according to the embodiment including a first restriction portion.

In this process, in the battery terminal 1, when predetermined fastening torque is applied to the fastening bolt 32, the first restriction portion 33f abuts on the plate nut 31 in a predetermined position in the axial direction X as illustrated in FIG. 8. This abutment restricts relative move of the bracket 33 to the plate nut 31 side along the axial direction X in an appropriate position. This configuration allows the battery terminal 1 to restrict move of the bracket 33 along the axial direction X in an appropriate position, thereby restricting the fastening force F1 in the axial direction X and the resulting pressing force F2 in the first width direction Y to appropriate magnitude.

Figure 9:
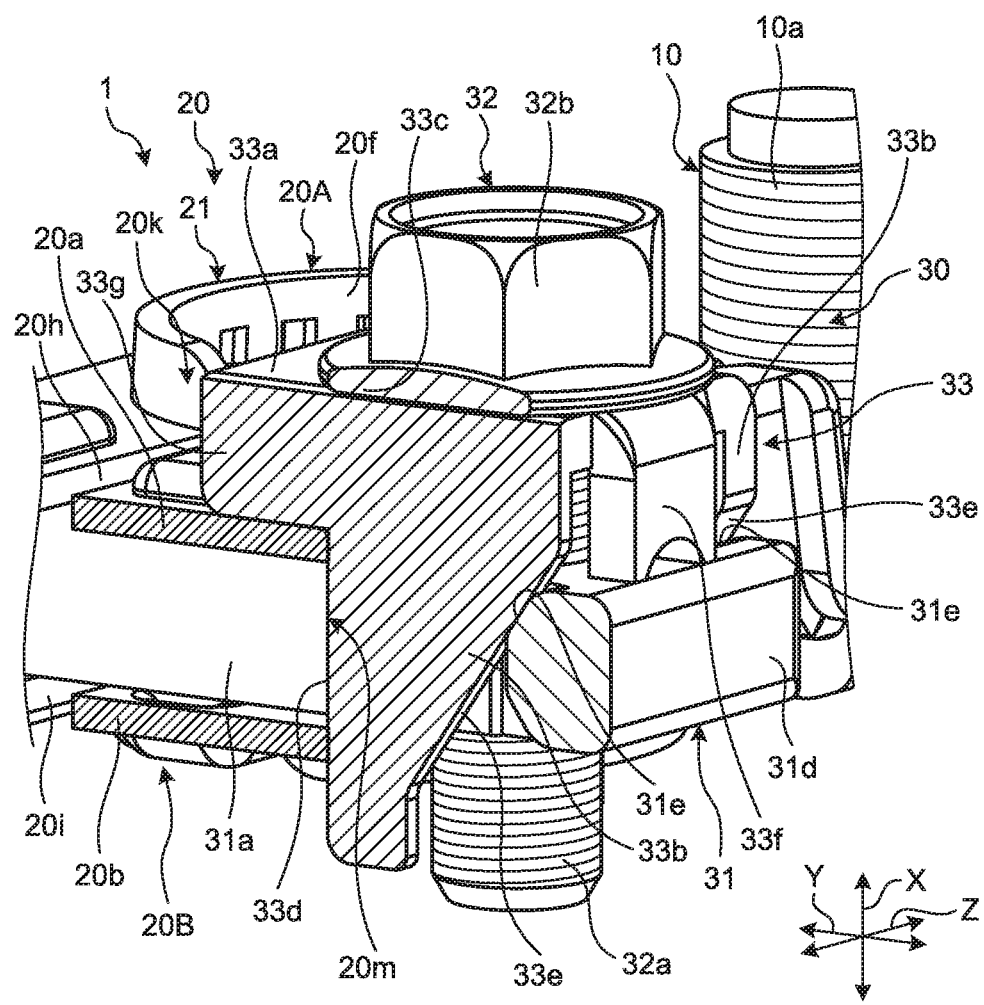
FIG. 9 is a partial sectional perspective view of the battery terminal according to the embodiment including second restriction portions.

Furthermore, in the battery terminal 1, the second restriction portions 33g may abut on the main body unit 20 at substantially the same time as or, depending on the case, a little earlier than abutment of the first restriction portion 33f onto the plate nut 31 as illustrated in FIG. 9. Even in this case, the battery terminal 1 is allowed to restrict relative move of the bracket 33 to the plate nut 31 side along the axial direction X in an appropriate position. This configuration allows the battery terminal 1 to properly restrict move of the bracket 33 along the axial direction X in an appropriate position, thereby properly restricting the fastening force F1 in the axial direction X and the pressing force F2 in the first width direction Y to appropriate magnitude.

The battery terminal 1 has the shank 10$a$ of the stud bolt 10 electrically connected with the connection terminal 52 provided to an end of the electric wire 54.

Reverse rotation of the fastening bolt 32 decreases the pressing force F2 and increases the widths of the slits 20$h$ and 20$i$. This process accordingly increases the diameters of the post insertion holes 20$f$ and 20$g$ and renders the battery terminal 1 detachable from the battery post 51.

The battery terminal 1 as described above is capable of fastening the main body unit 20 to the battery post 51 by the action of the plate nut 31, the fastening bolt 32, and the bracket 33 with the battery post 51 arranged in the post insertion holes 20$f$ and 20$g$ formed on the main body unit 20. In other words, in the battery terminal 1, the bracket 33 moves along the axial direction X with move of the fastening bolt 32 along the axial direction X and relatively moves with respect to the plate nut 31 along the first width direction Y in abutment with the first tapered surfaces 31$e$ of the plate nut 31. This configuration allows the battery terminal 1 to convert the fastening force F1 in the axial direction X generated between the fastening bolt 32 and the plate nut 31 into the pressing force F2 in the first width direction Y that presses the main body unit 20 in a manner reducing the widths of the slits 20$h$ and 20$i$, by the action of the bracket 33. Consequently, the battery terminal 1 is able to fasten the main body unit 20 to the battery post 51.

In this process, the battery terminal 1 restricts relative move of the bracket 33 to the plate nut 31 side along the axial direction X with the first restriction portion 33$f$ of the bracket 33 abutting on the plate nut 31 in a predetermined position in the axial direction X. This configuration allows the battery terminal 1 to restrict move of the fastening bolt 32 and the bracket 33 along the axial direction X in an appropriate position, thereby making it possible to restrict the fastening force F1 in the axial direction X generated between the fastening bolt 32 and the plate nut 31 to appropriate magnitude. The battery terminal 1 is therefore capable of restricting the pressing force F2 in the first width direction Y that presses the main body unit 20 to appropriate magnitude, thereby making it possible to appropriately having itself fastened to the battery post 51.

In the battery terminal 1, the first restriction portion 33$f$ abuts on the plate nut 31 in a predetermined position with predetermined fastening torque applied to the fastening bolt 32. With this configuration of the battery terminal 1, for example, in tightening operation of the fastening bolt 32 by a worker, if the first restriction portion 33$f$ of the bracket 33 abuts on the plate nut 31, the reaction force caused by tightening the fastening bolt 32 is markedly increased. This configuration of the battery terminal 1 allows the worker to, for example, intuitively recognize the status of tightening of the fastening bolt 32, which can achieve more appropriate tightening operation and thus improve workability.

In the battery terminal 1 as described above, the first restriction portion 33$f$ is formed in a manner projecting from the base portion 33$a$ along the axial direction X and is positioned between the pair of upstanding portions 33$b$ in the second width direction Z. With this configuration, the battery terminal 1 allows the first restriction portion 33$f$ to properly abut on the plate nut 31 in a predetermined position and further allows the first restriction portion 33$f$ to function as a beam portion on the base portion 33$a$. The battery terminal 1 is therefore able to increase the strength of the base portion 33$a$ of the bracket 33, which can prevent deformation of the base portion 33$a$ resulting from tightening of the fastening bolt 32 and prevent deformation of the whole bracket 33. In this point, the battery terminal 1 allows the fastening force F1 and the pressing force F2 to have appropriate magnitude, thereby appropriately having itself fastened to the battery post 51.

Furthermore, in the battery terminal 1 as described above, the second restriction portions 33$g$ may abut on the main body unit 20 at substantially the same time as or, depending on the case, a little earlier than abutment of the first restriction portion 33$f$ on the plate nut 31. Even in this case, the battery terminal 1 is capable of restricting relative move of the bracket 33 to the plate nut 31 side along the axial direction X in an appropriate position. With this configuration, the battery terminal 1 is capable of properly restricting move of the bracket 33 along the axial direction X in an appropriate position with the first restriction portion 33$f$ abutting on the plate nut 31, or with the second restriction portions 33$g$ abutting on the main body unit 20, or by using both measures. Furthermore, the battery terminal 1 is capable of properly restricting move of the bracket 33 along the axial direction X in appropriate positions on both sides of the bracket 33 in the first width direction Y using the first restriction portion 33$f$ and the second restriction portions 33$g$. The battery terminal 1 is therefore capable of properly restricting the fastening force F1 and the pressing force F2 to appropriate magnitude and thus having itself appropriately fastened to the battery post 51.

Moreover, the battery terminal 1 as described above utilizes the carrier 33B used in the manufacturing process of the bracket 33 for the first restriction portion 33$f$, and the kerf 33$h$ is therefore formed in an end on the side abutting on the plate nut 31 of the first restriction portion 33$f$. In other words, the battery terminal 1 constitutes the first restriction portion 33$f$ utilizing the carrier 33B used in the manufacturing process of the bracket 33, which is advantageous in, for example, improving the manufacturing efficiency and reducing the manufacturing cost.

Moreover, the battery terminal 1 as described above has the bracket 33 abut on each first tapered surface 31$e$ on the taper forming end portion 31$d$ through the corresponding second tapered surface 33$e$ while maintaining an appropriate contact state with the first tapered surface 31$e$. The battery terminal 1 is capable of converting the fastening force F1 in the axial direction X generated between the fastening bolt 32 and the plate nut 31 into the pressing force F2 along the first width direction Y by the action of the first tapered surfaces 31$e$ and the second tapered surfaces 33$e$ and is therefore capable of fastening the main body unit 20 to the battery post 51. In this case, the battery terminal 1 has the bracket 33 moving along the axial direction X with move of the fastening bolt 32 along the axial direction X with each first tapered surface 31$e$ and the corresponding second tapered surface 33$e$ abutting on each other. Furthermore, the battery terminal 1 has the plate nut 31 pulled toward the taper forming end portion 31$d$ side along the first width direction Y with each second tapered surface 33$e$ of the bracket 33 relatively moving with respect to the plate nut 31 along the first width direction Y in abutment with the corresponding first tapered surface 31$e$. This process allows the battery terminal 1 to convert the fastening force F1 into the pressing force F2 in the first width direction Y with rotation of the fastening bolt 32 around the axial direction X, thereby properly fastening the main body unit 20 to the battery post 51.

The above-described battery terminal according to an embodiment of the present invention is not limited to the above-described embodiment, and various changes can be made within the scope of the claims.

In the above description, the pair of annular portions 20a and 20b, the pair of retaining plate-shape portions 20c and 20d, and the bending connection portion 20e are integrally formed by the pressing and bending work or the like on a conductive metal plate; however, the embodiment is not limited thereto. For example, the main body unit 20 may include no bending connection portions 20e. Instead of this, the main body unit 20 may have a double-layered divisible structure in the axial direction X that includes an upper divisional body (the annular portion 20a and the retaining plate-shape portion 20c) constituting the upper board 20A and a lower divisional body (the annular portion 20b and the retaining plate-shape portion 20d) constituting the lower board 20B. The main body unit 20 may be configured by integrating the separately constituted upper divisional body and the lower divisional body. The main body unit 20 is not necessarily constituted of the upper board 20A and the lower board 20B and may be constituted of either one of them.

In the above description, the first tapered surfaces 31e are formed in pairs on the respective sides in the second width direction Z on the taper forming end portion 31d; however, without being limited to this configuration, one first tapered surface 31e may be formed.

In the above description, the bracket 33 includes the second restriction portions 33g; however, without being limited to this configuration, the bracket 33 may include no second restriction portions 33g. Furthermore, in the above description, the bracket 33 is formed with a part of the carrier 33B cut off from the assembly 33C as appropriate to separate the to-be-formed bracket 33A and with the separated to-be-formed bracket 33A bent; however, the embodiment is not limited thereto. The first restriction portion 33f has the kerf 33h formed in an end on a side abutting on the plate nut 31, which is the front end portion serving as the cutting position 33E; however, the embodiment is not limited thereto.

A battery terminal according to the present embodiment can fasten its main body unit to a battery post by the action of a penetration member, a fastening member, and a pressing force converting member with the battery post inserted in post insertion holes formed on the main body unit. In other words, in the battery terminal, the pressing force converting member moves along an axial direction with the fastening member moving along the axial direction and relatively moves with respect to the penetration member along a tightening direction in a manner abutting on first tapered surfaces of the penetration member. This configuration allows the battery terminal to convert fastening force in the axial direction generated between the fastening member and the penetration member into pressing force in the tightening direction pressing the main body unit in such a manner that reduces the widths of the slits by the action of the pressing force converting member. This configuration allows the battery terminal to fasten the main body unit to a battery post. In this process, the battery terminal restricts relative move of the pressing force converting member to the penetration member side along the axial direction with a first restriction portion of the pressing force converting member abutting on the penetration member at a predetermined position in the axial direction. This configuration allows the battery terminal to restrict move of the fastening member and the pressing force converting member along the axial direction at an appropriate position, thereby restricting the fastening force in the axial direction generated between the fastening member and the penetration member to appropriate magnitude. The battery terminal can therefore restrict the pressing force in the tightening direction pressing the main body unit to appropriate magnitude and thus appropriately have itself fastened to the battery post.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery terminal comprising:
    a main body unit that is provided with a post insertion hole to which a battery post is inserted and a slit continuous to the post insertion hole;
    a penetration member that is disposed in a manner extending from a first end side of the main body unit to a second end side of the main body unit across the slit along a tightening direction as a direction intersecting an axial direction of the battery post and crossing the slit, includes an abutting portion abutting on the main body unit formed in the first end side in the tightening direction, and has a threaded hole penetrating in the axial direction and having a groove and a taper forming end portion provided with a first tapered surface formed in the second end side in the tightening direction;
    a fastening member that is threadedly engaged with the threaded hole and moves along the axial direction with rotation around the axial direction; and
    a pressing force converting member that is provided in a manner movable along the axial direction with move of the fastening member along the axial direction and movable with respect to the penetration member along the tightening direction in abutment with the first tapered surface, the pressing force converting member abutting on the main body unit in the second end side of the main body unit and converting fastening force in the axial direction generated between the fastening member and the penetration member with rotation of the fastening member around the axial direction into pressing force in the tightening direction that presses the main body unit between the abutting portion and the pressing force converting member along the tightening direction in a direction for reducing a width of the slit of the main body unit, wherein
    the pressing force converting member includes a first restriction portion that is capable of restricting movement to the penetration member side along the axial direction by abutting on the penetration member in a predetermined position in the axial direction, a pair of upstanding portions having an abutting surface abuttable on the main body unit, a second tapered surface abuttable on the first tapered surface, and base portion, wherein
    the first restriction portion is formed in a manner projecting from the base portion along the axial direction and is positioned between the pair of upstanding portions in a facing direction.

2. The battery terminal according to claim 1, wherein
the first tapered surface is formed in pairs on respective sides in the facing direction intersecting the axial direction and the tightening direction of the taper forming end portion,
the pressing force converting member includes a base portion through which a shank of the fastening member penetrates along the axial direction, wherein the pair of upstanding portions is formed in a manner projecting from the base portion along the axial direction, and formed in a manner facing each other along the facing direction.

3. The battery terminal according to claim 1, wherein the pressing force converting member includes a second restriction portion that is capable of restricting move to the main body unit side along the axial direction by abutting the main body unit, the second restriction portion is positioned in the main body unit side in the tightening direction, and the first restriction portion is positioned opposite to the main body unit side in the tightening direction.

4. The battery terminal according to claim 2, wherein the pressing force converting member includes a second restriction portion that is capable of restricting move to the main body unit side along the axial direction by abutting the main body unit, the second restriction portion is positioned in the main body unit side in the tightening direction, and the first restriction portion is positioned opposite to the main body unit side in the tightening direction.

5. The battery terminal according to claim 1, wherein the first restriction portion has a kerf formed in an end on a side abutting the penetration member.

6. The battery terminal according to claim 2, wherein the first restriction portion has a kerf formed in an end on a side abutting the penetration member.

7. The battery terminal according to claim 3, wherein the first restriction portion has a kerf formed in an end on a side abutting the penetration member.

8. The battery terminal according to claim 1, wherein the first restriction portion abuts on the penetration member in a state where a predetermined torque is applied to the fastening member.

9. The battery terminal according to claim 2, wherein the first restriction portion abuts on the penetration member in a state where a predetermined torque is applied to the fastening member.

10. The battery terminal according to claim 3, wherein the first restriction portion abuts on the penetration member in a state where a predetermined torque is applied to the fastening member.

11. The battery terminal according to claim 5, wherein the first restriction portion abuts on the penetration member in a state where a predetermined torque is applied to the fastening member.

12. The battery terminal according to claim 1, wherein the pressing force converting member has the second tapered surface abutting on the first tapered surface and includes a portion with the second tapered surface formed positioned between the main body unit and the taper forming end portion in the tightening direction, and
the first tapered surface and the second tapered surface are inclined toward a direction for converting fastening force in the axial direction generated between the fastening member and the penetration member into pressing force in the tightening direction that presses the main body unit between the abutting portion and the pressing force converting member along the tightening direction, when the pressing force converting member together with the fastening member approaches the penetration member side along the axial direction with rotation of the fastening member around the axial direction.

13. The battery terminal according to claim 2, wherein the pressing force converting member has the second tapered surface abutting on the first tapered surface and includes a portion with the second tapered surface formed positioned between the main body unit and the taper forming end portion in the tightening direction, and
the first tapered surface and the second tapered surface are inclined toward a direction for converting fastening force in the axial direction generated between the fastening member and the penetration member into pressing force in the tightening direction that presses the main body unit between the abutting portion and the pressing force converting member along the tightening direction, when the pressing force converting member together with the fastening member approaches the penetration member side along the axial direction with rotation of the fastening member around the axial direction.

14. The battery terminal according to claim 3, wherein the pressing force converting member has the second tapered surface abutting on the first tapered surface and includes a portion with the second tapered surface formed positioned between the main body unit and the taper forming end portion in the tightening direction, and
the first tapered surface and the second tapered surface are inclined toward a direction for converting fastening force in the axial direction generated between the fastening member and the penetration member into pressing force in the tightening direction that presses the main body unit between the abutting portion and the pressing force converting member along the tightening direction, when the pressing force converting member together with the fastening member approaches the penetration member side along the axial direction with rotation of the fastening member around the axial direction.

15. The battery terminal according to claim 5, wherein the pressing force converting member has the second tapered surface abutting on the first tapered surface and includes a portion with the second tapered surface formed positioned between the main body unit and the taper forming end portion in the tightening direction, and
the first tapered surface and the second tapered surface are inclined toward a direction for converting fastening force in the axial direction generated between the fastening member and the penetration member into pressing force in the tightening direction that presses the main body unit between the abutting portion and the pressing force converting member along the tightening direction, when the pressing force converting member together with the fastening member approaches the penetration member side along the axial direction with rotation of the fastening member around the axial direction.

16. The battery terminal according to claim 8, wherein the pressing force converting member has the second tapered surface abutting on the first tapered surface and includes a portion with the second tapered surface formed positioned between the main body unit and the taper forming end portion in the tightening direction, and the first tapered surface and the second tapered surface are inclined toward a direction for converting fastening force in the axial direction generated between the fastening member and the penetration member into pressing force in the tightening direction that presses the main body unit between the abutting portion and the pressing force converting member along the tightening direction, when the pressing force converting member together with the fastening member approaches the penetration member side along the axial direction with rotation of the fastening member around the axial direction.

17. A battery terminal comprising:

a main body unit that is provided with a post insertion hole to which a battery post is inserted and a slit continuous to the post insertion hole;

a penetration member that is disposed in a manner extending from a first end side of the main body unit to a second end side of the main body unit across the slit along a tightening direction as a direction intersecting an axial direction of the battery post and crossing the slit, includes an abutting portion abutting on the main body unit formed in the first end side in the tightening direction, and has a threaded hole penetrating in the axial direction and having a groove and a taper forming end portion provided with a first tapered surface formed in the second end side in the tightening direction;

a fastening member that is threadedly engaged with the threaded hole and moves along the axial direction with rotation around the axial direction; and a pressing force converting member that is provided in a manner movable along the axial direction with move of the fastening member along the axial direction and movable with respect to the penetration member along the tightening direction in abutment with the first tapered surface, the pressing force converting member abutting on the main body unit in the second end side of the main body unit and converting fastening force in the axial direction generated between the fastening member and the penetration member with rotation of the fastening member around the axial direction into pressing force in the tightening direction that presses the main body unit between the abutting portion and the pressing force converting member along the tightening direction in a direction for reducing a width of the slit of the main body unit, wherein the pressing force converting member includes a first restriction portion that is capable of restricting movement to the penetration member side along the axial direction by abutting on the penetration member in a predetermined position in the axial direction, and the pressing force converting member includes a second restriction portion that is capable of restricting move to the main body unit side along the axial direction by abutting the main body unit, the second restriction portion is positioned in the main body unit side in the tightening direction, and the first restriction portion is positioned opposite to the main body unit side in the tightening direction.

* * * * *